UNITED STATES PATENT OFFICE.

JEAN VILHELM SKOGLUND, OF STOCKHOLM, SWEDEN.

EXPLOSIVE POWDER.

SPECIFICATION forming part of Letters Patent No. 487,080, dated November 29, 1892.

Application filed June 22, 1891. Serial No. 397,065. (No specimens.)

*To all whom it may concern:*

Be it known that I, JEAN VILHELM SKOGLUND, a subject of the King of Sweden and Norway, residing at Stockholm, Sweden, have invented an Improvement in Explosive Powder, of which the following is a specification.

The object of this invention is to produce a so-called "smokeless powder" for firearms, which for its explosive qualities and its stability is equal or superior to all other kinds of gunpowder. This powder consists, essentially, of nitrates of cellulose or gun-cotton. It is well known that acetone, ethyl acetate, and other kinds of ether dissolve or gelatinize gun-cotton; but if said mass after graining and drying is exploded the explosion will be very incomplete and ineffective, because the kernels or the inner cores of the grains and also whole grains remain unburned. This results from the fact that it is impossible after the gun-cotton has been gelatinated to completely evaporate all the dissolving fluids, and this very much diminishes its explosive capacity.
In this present invention gun-cotton is used as a base and a solvent is used which will evaporate perfectly and just as easily in the kernel or the innermost core of the grain as on its outer surface, so that exactly the same product is always obtained at each fabrication instead of the result being very capricious and uncertain, as hitherto. When a fat or a free fatty acid—such as palmitine or stearine—is dissolved in the solvent, which should be ethyl acetate or acetone or equivalent—such as ethyl formate—and the gun-cotton is gelatinated with the fat solution under certain precautionary treatment, described below, and the mass thus produced is grained, the ethyl acetate, &c., is easily evaporated at a moderate heat by very brief heating. The fat or the fatty acid which remains in the grain, besides serving as remover of the ether, diminishes the burning speed or velocity of explosion. The more fat or fatty acid there is with the ether the more slow-burning will the powder be. The reason why the ether is so easily evaporated from the gelatine when fat is dissolved therein is as follows: When the gun-cotton is gelatinated or dissolved in the solution of fat or fatty acid, both the gun-cotton and the fat exist together in a dissolved state and thoroughly mixed. If then the ether is allowed to evaporate, the gelatine is concentrated and at a certain point the solvent is unable to keep the whole of the mass dissolved, as the fat, which in this case is more inclined than the gun-cotton to remain in soluble state, the gun-cotton precipitates. This operation is continued until all the gun-cotton is precipitated and the very strongly-concentrated warm fatty solution remains, which has no effect on the gun-cotton, and the remaining ether passes off freely from it. Only so much of the solution is used as is necessary for obtaining what I call a "concentrated gelatine." The quantity of the ether varies somewhat with the quantity of the fat dissolved therein.

When gelatinating, the following facts are important to observe: The mixture of the solution of fat or fatty acid and the gun-cotton is made very gently, without kneading, and in such proportions, or thereabout, as stated below, and the mass thus prepared is pressed to obtain the most satisfactory gelatine. If, on the contrary, the gun-cotton is kneaded or worked very hard into the solution of acetone or ether and the fat, a gelatine will be produced in which the fatty material appears as if separated during such working and the said gelatine retains obstinately the ether and the fat has no effect in the evaporating operation. When the explosion of the finished powder takes place, the fat remaining is either volatilized or burned; but it is not necessary to make the fat burn by adding an oxygenic factor, because the fat and the products or bodies generated therefrom in the explosion will produce an extremely small amount of smoke; but saltpeter or equivalent material may be mixed with the other materials, when the powder will be more powerful, but there will be more smoke. Lampblack or other inert matter may be added to vary the color or speed of combustion, if desired.

The practical manner of manufacture is as follows: The gun-cotton is preferably ground fine and whenever desired saltpeter is added. The solvent which I prefer is ethyl acetate or acetone, which need not necessarily be chemically pure, and fat or fatty acid is added in the proper proportions. The fatty acid—such as stearic acid—is added to the ethyl acetate or acetone and the gun-cotton in about the proportion of eight parts fatty acid, ninety to one hundred parts ethyl acetate or acetone, and one hundred parts nitrated cellulose, and the materials are mixed thoroughly in a drum with a stirrer. Sufficient of the solvent is to be used in all cases to properly gelatinize the nitrated cellulose. This mass is then pressed in order that the gelatinating may take place. After this the gelatine is formed into grains and dried as usual. These grains may be pressed after being dried, which will make them more solid and reduce the rate of combustion.

I am aware that an oil has been employed with an explosive containing nitro-glycerine. On the contrary, no nitro-glycerine is employed in my explosive.

I claim as my invention—

1. The explosive material herein specified, consisting of dried grains of nitrated cellulose gelatinized by means of a solvent containing a fat or fatty acid.

2. The explosive material herein specified, consisting of dried grains of nitrated cellulose gelatinized by means of a solvent containing a fat or fatty acid and saltpeter.

Signed by me this 18th day of June, 1891.

JEAN VILHELM SKOGLUND.

Witnesses:
GEO. T. PINCKNEY,
WILLIAM G. MOTT.